United States Patent [19]
Ishii

[11] Patent Number: 5,687,141
[45] Date of Patent: Nov. 11, 1997

[54] METHOD AND APPARATUS FOR RECORDING INFORMATION ON MAGNETOOPTICAL RECORDING MEDIUM WHILE CANCELING EXTERNAL STRAY MAGNETIC FIELD

[75] Inventor: Kazuyoshi Ishii, Tokyo, Japan

[73] Assignee: Canon Kabushiki Kaisha, Tokyo, Japan

[21] Appl. No.: 320,823

[22] Filed: Oct. 7, 1994

Related U.S. Application Data

[63] Continuation of Ser. No. 60,526, May 13, 1993, abandoned.

[30] Foreign Application Priority Data

May 15, 1992 [JP] Japan ................... 4-148080

[51] Int. Cl.$^6$ .................................................. G11B 11/00
[52] U.S. Cl. ........................ 369/13; 360/114; 360/59
[58] Field of Search ............................ 369/13, 44.11, 369/100, 32, 44.14, 44.23, 44.31, 44.39, 14, 110, 124; 360/59, 114, 66, 72.02, 104, 110, 103, 75, 60; 365/122

[56] References Cited

U.S. PATENT DOCUMENTS

| | | | |
|---|---|---|---|
| 4,862,437 | 8/1989 | Okada | 369/13 |
| 4,959,820 | 9/1990 | Horimai et al. | 369/13 |

FOREIGN PATENT DOCUMENTS

| | | |
|---|---|---|
| 0019161 | 1/1991 | Japan . |
| 03134803 | 6/1991 | Japan . |
| 03216836 | 9/1991 | Japan . |

Primary Examiner—Ali Neyzari
Attorney, Agent, or Firm—Fitzpatrick, Cella, Harper & Scinto

[57] ABSTRACT

A magnetooptical recording apparatus effects recording of information on a recording medium using an optical head and a magnetic head while cancelling an external stray magnetic field generated from an actuator, a linear motor or the like. The external stray magnetic field is detected by a detection circuit. A magnetic field for cancelling the detected external stray magnetic field is applied to the recording medium using a magnetic member, a coil wound around the magnetic member and a power source for supplying current to the coil. The external stray magnetic field is detected on the basis of a shift amount, caused by the external stray magnetic field, of a B-H curve representing a relationship between a magnetic field H running through the magnetic member and a magnetic flux B generated in the magnetic member.

27 Claims, 7 Drawing Sheets

METHOD AND APPARATUS FOR RECORDING INFORMATION ON MAGNETOOPTICAL RECORDING MEDIUM WHILE CANCELING EXTERNAL STRAY MAGNETIC FIELD

This application is a continuation of prior application, Ser. No. 08/060,526 filed May 13, 1993, now abandoned.

BACKGROUND OF THE INVENTION

1. Field of the Invention

The present invention relates to a method and apparatus for recording information on a magnetooptical recording medium.

2. Related Background Art

Figure 1:
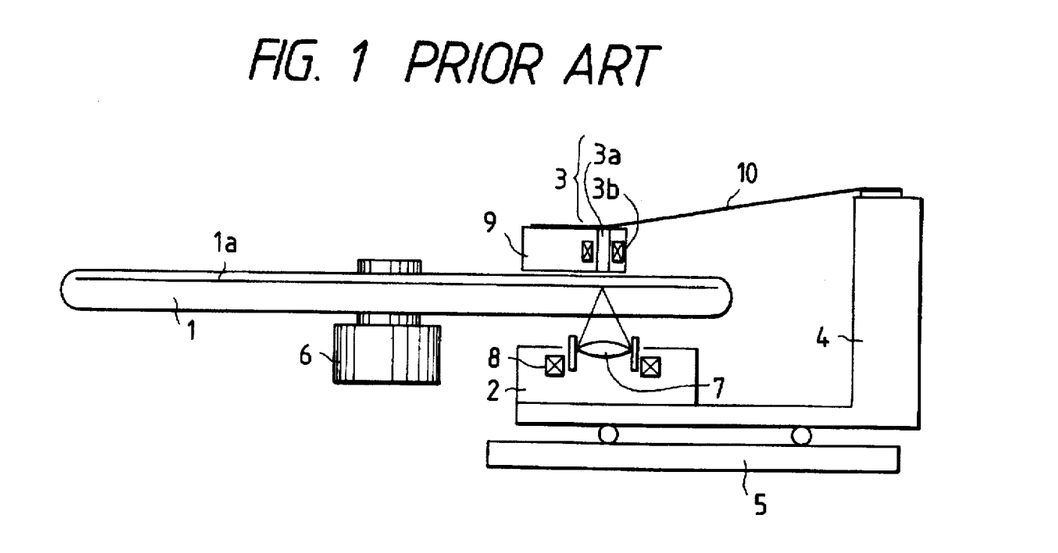
FIG. 1 is a schematic view showing an arrangement of a conventional magnetooptical recording apparatus.

Conventionally, a magnetooptical recording apparatus for recording an information signal on a disk as a magnetooptical recording medium by a magnetic field modulation method is known. FIG. 1 shows a schematic arrangement of this conventional apparatus. The apparatus shown in FIG. 1 includes a disk 1, an optical head 2, and a magnetic head 3. The optical head 2 and the magnetic head 3 are integrated by a coupling member 4, and can access an arbitrary radial position on the disk 1 by a linear motor 5. The apparatus also includes a spindle motor 6 for rotating the disk 1.

In the magnetooptical recording apparatus with the above-mentioned arrangement, the optical head 2 radiates a laser beam focused by an objective lens 7 onto a recording film 1a on the disk 1. The objective lens 7 is subjected to position control in a focusing direction and a direction perpendicular to tracks by an actuator 8, so that the converged point of the laser beam accurately follows signal tracks concentrically or spirally formed on the recording film 1a.

The magnetic head 3 is arranged by winding a coil 3b around a core 3a as a magnetic member. The magnetic head 3 is mounted on a slider 9 which floats above the disk 1 by air, and is held by a load beam 10, one end of which is fixed to the coupling member 4.

When an information signal is recorded, current modulated according to the information signal is supplied to the coil 3b of the magnetic head, and the core 3a applies a modulated magnetic field on the recording film on the disk 1 in a direction perpendicular to the disk 1. At the same time, a laser beam focused by the objective lens 7 is radiated on the medium portion applied with the modulated magnetic field. In this manner, the information signal is recorded on the recording film 1a as a magnetization pattern corresponding to the information signal. According to this magnetic field modulation method, a new information signal can be overwritten on a recorded old information signal.

As described above, in the magnetooptical recording apparatus, the actuator, linear motor, and the like for the optical head comprise electromagnetic driving means.

For this reason, magnetic fields generated by these means leak, and often influence the medium portion applied with the modulated magnetic field in an information signal recording mode. Especially, components, in a direction perpendicular to the disk, of such external stray magnetic fields often adversely affect information signal recording.

Figure 2:
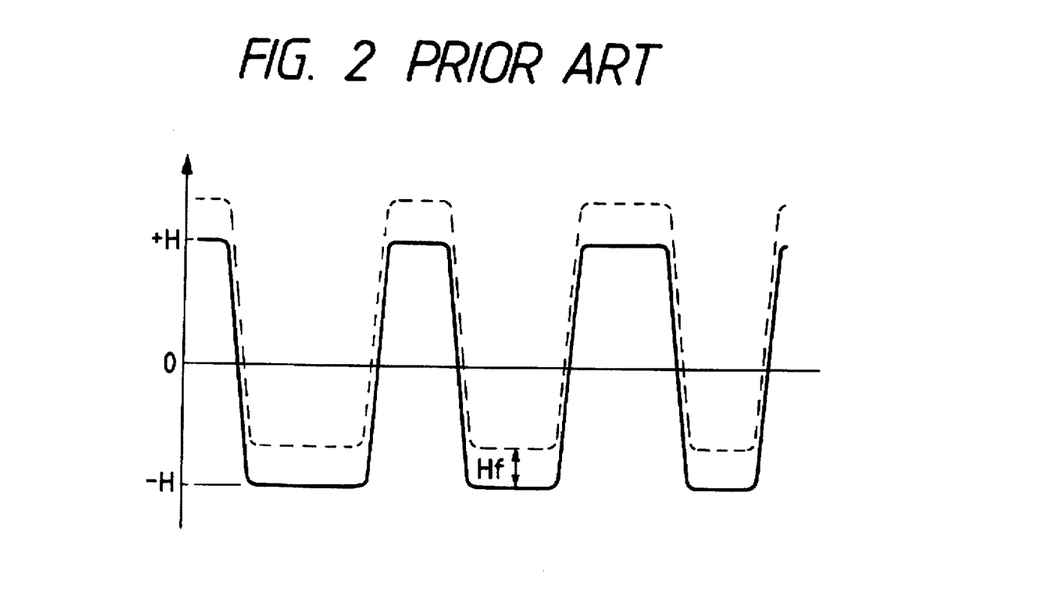
FIG. 2 is a chart showing the waveforms of magnetic fields applied to a medium in the apparatus shown in FIG. 1.

This adverse effect will be described below with reference to FIG. 2. A waveform indicated by a solid curve in FIG. 2 represents a modulated magnetic field applied to the recording film 1a, and has an amplitude of ±H. When the above-mentioned external stray magnetic field is present, and its component in the direction perpendicular to the disk is +$H_r$, a synthesized magnetic field actually applied to the recording film 1a is one indicated by a dotted curve in FIG. 2. As can be seen from FIG. 2, the amplitude of the synthesized magnetic field is decreased by $H_r$ at one polarity side. If the amplitude of the applied magnetic field cannot have a sufficient magnitude at one polarity side owing to a decrease by $H_r$, a signal may be recorded incompletely, or an old information signal may not be completely erased upon overwrite recording. For this reason, highly reliable information signal recording cannot be guaranteed.

SUMMARY OF THE INVENTION

It is an object of the present invention to provide a method and apparatus for solving the conventional problems, and performing information recording on a magnetooptical recording medium with high reliability.

According to one aspect which can achieve the above object of the present invention, a magnetooptical recording apparatus comprises:

an optical head for radiating a light beam onto a magnetooptical recording medium;

a magnetic head for applying a magnetic field modulated according to information to the medium; and magnetic field applying means for applying, to the medium, a magnetic field for canceling an external stray magnetic field applied to the medium.

A method of recording information on a magnetooptical recording medium using a magnetooptical recording apparatus including a magnetic head and magnetic field generation means according to the above-mentioned aspect which can achieve the above object of the present invention, comprises the steps of:

detecting an external stray magnetic field applied to the medium;

applying, from magnetic field applying means, a magnetic field for canceling the detected external stray magnetic field to the medium;

radiating a light beam from the optical head onto the medium; and applying a magnetic field modulated according to information from the magnetic head to the medium.

According to another aspect which can achieve the above object, a magnetooptical recording apparatus comprises:

an optical head for radiating a light beam onto a magnetooptical recording medium;

a magnetic head for applying a modulated magnetic field to the medium;

detection means for detecting an external stray magnetic field applied to the medium;

a direct current source for generating a direct current corresponding to the external stray magnetic field detected by the detection means; and a drive circuit for driving the magnetic head in response to the direct current and a recording current modulated according to information.

A method of recording information on a magnetooptical recording medium using a magnetooptical recording apparatus including an optical head and a magnetic head according to the above-mentioned aspect which can achieve the above object, comprises the steps of:

detecting an external stray magnetic field applied to the medium;

applying a magnetic field which is modulated according to a direct current corresponding to the detected external stray magnetic field and a recording current modulated according to information by the magnetic head; and radiating a light beam onto the medium by the optical head.

According to still another aspect which can achieve the above object, a magnetooptical recording apparatus comprises:

an optical head for selectively radiating one of a light beam having a predetermined intensity and a light beam which is intensity-modulated according to information to a magnetooptical recording medium;

a magnetic head for, when the light beam having the predetermined intensity is radiated onto the medium, applying a magnetic field modulated according to information onto the medium; and magnetic field applying means for, when the light beam having the predetermined intensity is radiated onto the medium, applying a magnetic field for canceling an external stray magnetic field applied to the medium, onto the medium, and for, when the light beam, which is intensity-modulated according to information, is radiated onto the medium, applying a recording bias magnetic field in a predetermined direction onto the medium.

DETAILED DESCRIPTION OF THE PREFERRED EMBODIMENTS

Figure 3:
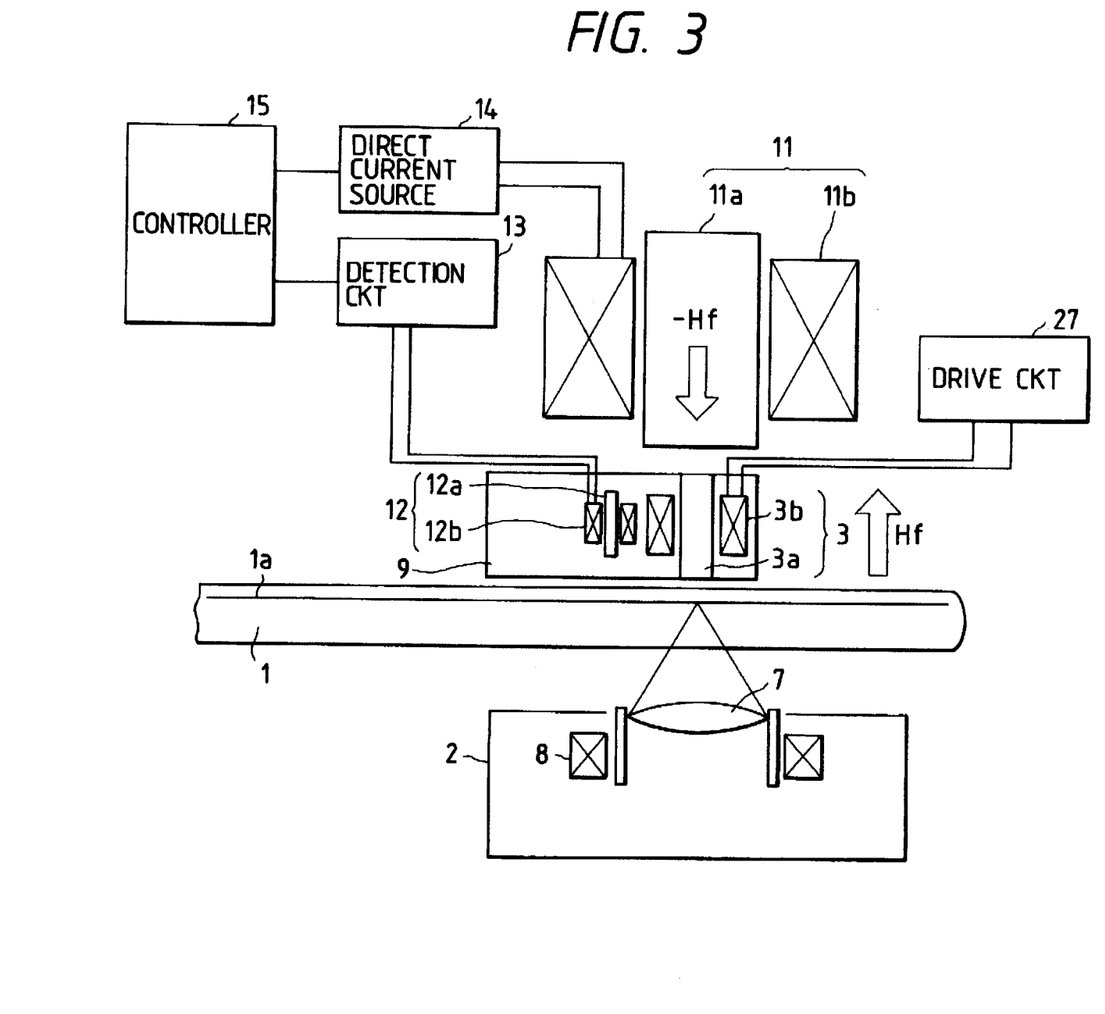
FIG. 3 is a schematic view showing an arrangement of a magnetooptical recording apparatus according to the first embodiment of the present invention.

FIG. 3 is a schematic view showing an arrangement of a magnetooptical recording apparatus according to the first embodiment of the present invention. The same reference numerals in FIG. 3 denote the same parts as in FIG. 1, and a detailed description thereof will be omitted. In FIG. 3, a magnetic field detector 12 detects an external stray magnetic field $H_f$ leaking from, e.g., an actuator 8, a linear motor (not shown), or the like. The magnetic field detector 12 comprises a rod-like magnetic member 12a and a coil 12b wound around the member 12a. The magnetic member 12a adopts, e.g., an amorphous metal magnetic member or ferrite.

A canceling magnetic field generator 11 is arranged above or near a magnetic head 3. The canceling magnetic field generator 11 is constituted by winding a coil 11b around a magnetic member 11a. The generator 11 generates a magnetic field $-H_f$ for canceling the external stray magnetic field, and applies the generated magnetic field to a recording film 1a of a disk 1.

The external stray magnetic field $H_f$ is detected as an electrical signal by a detection circuit 13 connected to the magnetic field detector 12, and the detected value is supplied to a controller 15. The controller 15 supplies a control signal according to the detected value to a direct current source 14.

In a signal recording mode, the direct current source 14 supplies current to the coil 11b of the canceling magnetic field generator 11 on the basis of the control signal from the controller 15 so as to apply the canceling magnetic field $-H_f$ to the disk 1, thereby canceling the external stray magnetic field $H_f$. At the same time, a recording current modulated according to an information signal by a drive circuit 27 is supplied to the magnetic head 3.

The principle of magnetic field detection by the magnetic field detector 12 will be described below.

Figure 4:
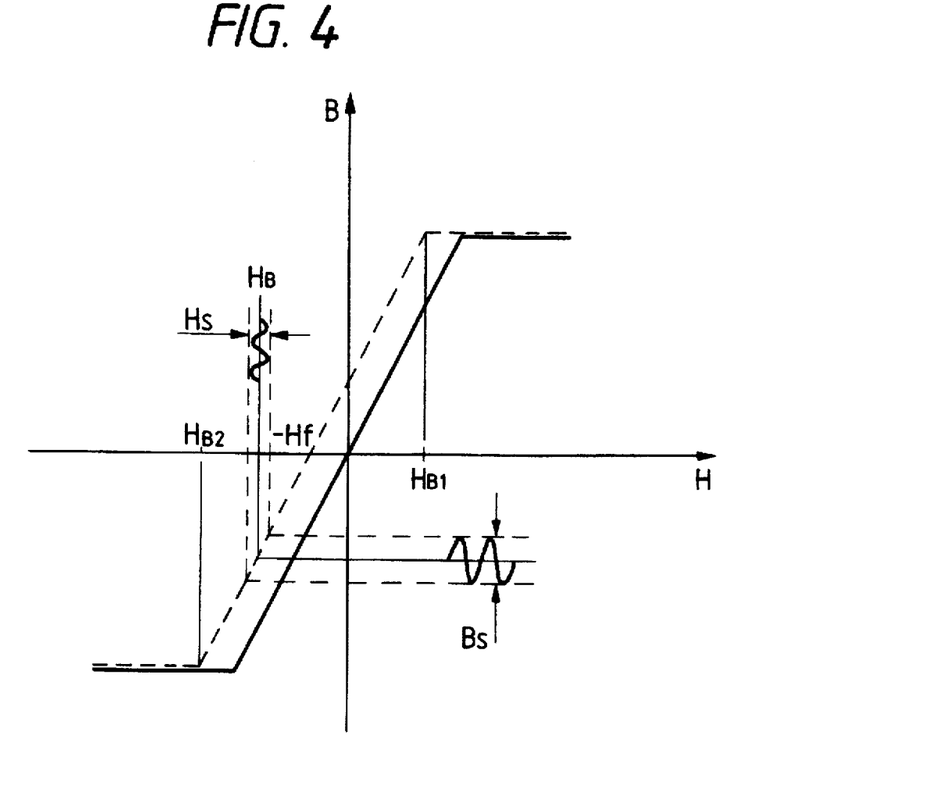
FIG. 4 is a graph showing a B-H curve of a magnetic member in the apparatus shown in FIG. 3.

When current flows through the coil 12b to excite the magnetic member 12a in its longitudinal direction, a magnetic field H extending through the magnetic member 12a and a magnetic flux B generated in the magnetic member 12a have a relationship indicated by a solid B-H curve in FIG. 4. The magnetic flux B is almost proportional to the magnetic field H if the magnetic field H is small. However, if the magnetic field H is sufficiently increased, the magnetic flux B is saturated, and is no longer increased beyond a saturation magnetic flux.

If the external stray magnetic field $H_f$ is running through the magnetic member 12a in the longitudinal direction, the above-mentioned B-H curve is shifted by $-H_f$, as indicated by a dotted curve in FIG. 4. In the shifted B-H curve, if the magnetic flux B is saturated by a positive magnetic field $H_{B1}$ and a negative magnetic field $H_{B2}$, $H_f=-\frac{1}{2}(H_{B1}+H_{B2})$.

The magnetic fields $H_{B1}$ and $H_{B2}$ can be detected as follows. An alternating-current signal $I_S$ added with a DC bias current $I_B$ is supplied to the coil 12b, and alternating-current excitation is performed under a bias magnetic field $H_B$. If the amplitude of alternating-current excitation is represented by $H_S$, an alternating-current magnetic flux having an amplitude $B_S$ is generated in the magnetic member 12a. At this time, an alternating voltage $V_S$ corresponding to a change rate (time differential component) of the alternating-current magnetic flux is generated across the two ends of the coil 12b. Therefore, $V_S/I_S=Z_S$ (impedance of the coil 12b) corresponds to the inclination of the B-H curve under the bias magnetic field $H_S$.

Figure 5:
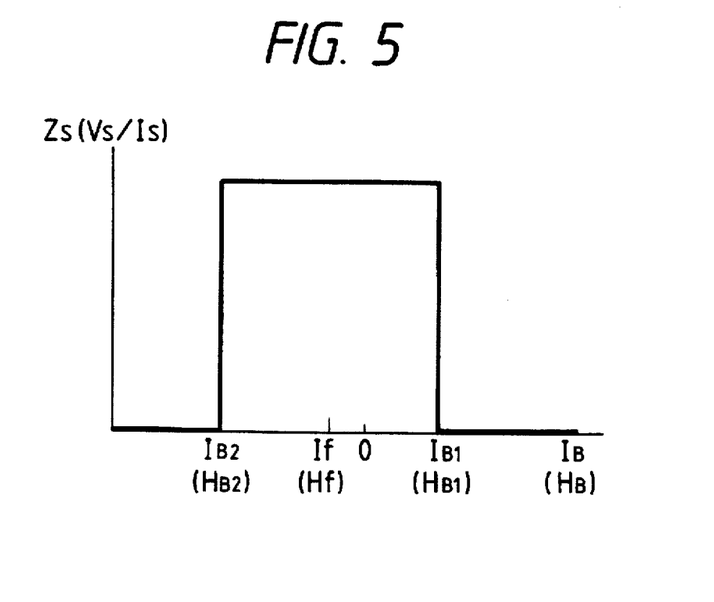
FIG. 5 is a graph showing a change in impedance caused by current flowing through a coil in the apparatus shown in FIG. 3.

In a saturation region ($H_B>H_{B1}$ or $H_B<H_{B2}$) of the magnetic field B, the inclination of the B-H curve is very small, and the impedance $Z_S$ of the coil 12b also assumes a very small value. Therefore, the impedance $Z_S$ of the coil 12b exhibits characteristics shown in FIG. 5 with respect to the bias current $I_B$ (bias magnetic field $H_B$) supplied to the coil 12b. Thus, the magnetic fields $H_{B1}$ and $H_{B2}$ are detected from change points $I_{B1}$ and $I_{B2}$ of the impedance $Z_S$.

The arrangement of the detection circuit 13 for detecting an external stray magnetic field on the basis of the above-mentioned principle will be described below with reference to FIG. 6. A direct current source 17 generates a bias current $I_B$ on the basis of a control signal from the controller 15, and can gradually change the magnitude of the current $I_B$. On the other hand, an oscillator 16 generates an alternating-current signal having a predetermined frequency. An adding circuit 19 synthesizes the bias current $I_B$ and the alternating-current signal $I_S$, and supplies the synthesized current to the coil 12b of the magnetic field detector 12.

The supplied current is detected by a current detection circuit 20, the alternating-current signal component $I_S$ alone is extracted by a high-pass filter (H.P.F.) 22 from the supplied current, and an alternating-current amplitude $|I_S|$ is detected by an amplitude detection circuit 24. A direct current component $I_B$ alone is extracted by a low-pass filter (L.P.F.) 27, and the detected current value is supplied to the controller 15.

A voltage generated across the two ends of the coil 12b is detected by a voltage detection circuit 21. An alternating-current component $V_S$ alone is extracted by a high-pass filter (H.P.F.) 23, and an alternating voltage amplitude $|V_S|$ is detected by an amplitude detection circuit 25. The ratio (impedance) $|V_S|/|I_S|$ of the alternating voltage amplitude $|V_S|$ to the alternating-current amplitude $|I_S|$ is calculated by a dividing circuit 26, and the calculated value is supplied to the controller 15. The controller 15 detects saturation of the magnetic flux B in the magnetic member 12a on the basis of a change in the impedance detected value obtained when the bias current $I_S$ is gradually changed, stores bias current values $I_{B1}$ and $I_{B2}$ corresponding to saturation points, and determines the magnitude of the external stray magnetic field $H_f$ on the basis of a value $I_f=\frac{1}{2}(I_{B1}+I_{B2})$ calculated from these current values. The canceling magnetic field generator 11 generates a canceling magnetic field $-H_f$ for canceling the external stray magnetic field on the basis of this detection result, and cancels the external stray magnetic field.

Another arrangement of the detection circuit 13 including different coils for respectively receiving the bias current $I_B$ and the alternating-current signal $I_S$ will be described below with reference to FIG. 7. The same reference numerals in FIG. 7 denote the same parts as in FIG. 6, and a detailed description thereof will be omitted. In the magnetic field detector, a coil 12c for receiving a bias current $I_B$ and the coil 12b for receiving the alternating-current signal $I_S$ are wound around the single magnetic member 12a.

The direct current source 17 generates a bias current $I_B$, and gradually changes its magnitude. The bias current $I_B$ is supplied to the coil 12c, and a current value is detected by a current value detection circuit 18. Then, only a low-frequency component is selectively extracted by the L.P.F. 27 from the bias current $I_B$, and is supplied to the controller 15.

The coil 12b receives an alternating-current signal $I_S$ generated by the oscillator 16. The current value of the received alternating-current signal $I_S$ is selectively detected by the current detection circuit 20 and the H.P.F. 22, and an alternating-current amplitude $|I_S|$ is detected by the amplitude detection circuit 24. A voltage generated across the two ends of the coil 12b is detected by the voltage detection circuit 21 and H.P.F. 23, and an alternating voltage amplitude $|V_S|$ is detected by the amplitude detection circuit 25. The ratio (impedance) $|V_S|/|I_S|$ of the alternating voltage amplitude $|V_S|$ to the alternating-current amplitude $|I_S|$ is calculated by the dividing circuit 26, and the calculated value is supplied to the controller 15. The controller 15 detects saturation of the magnetic flux B in the magnetic member 12a on the basis of a change in the impedance detected value obtained when the bias current $I_B$ is gradually changed, stores bias current values $I_{B1}$ and $I_{B2}$ corresponding to saturation points, and determines the magnitude of the external stray magnetic field $H_f$ on the basis of a value $I_f=\frac{1}{2}(I_{B1}+I_{B2})$ calculated from these current values. The canceling magnetic field generator 11 generates a canceling magnetic field $-H_f$ for canceling the external stray magnetic field on the basis of this detection result, and cancels the external stray magnetic field.

Figure 8:
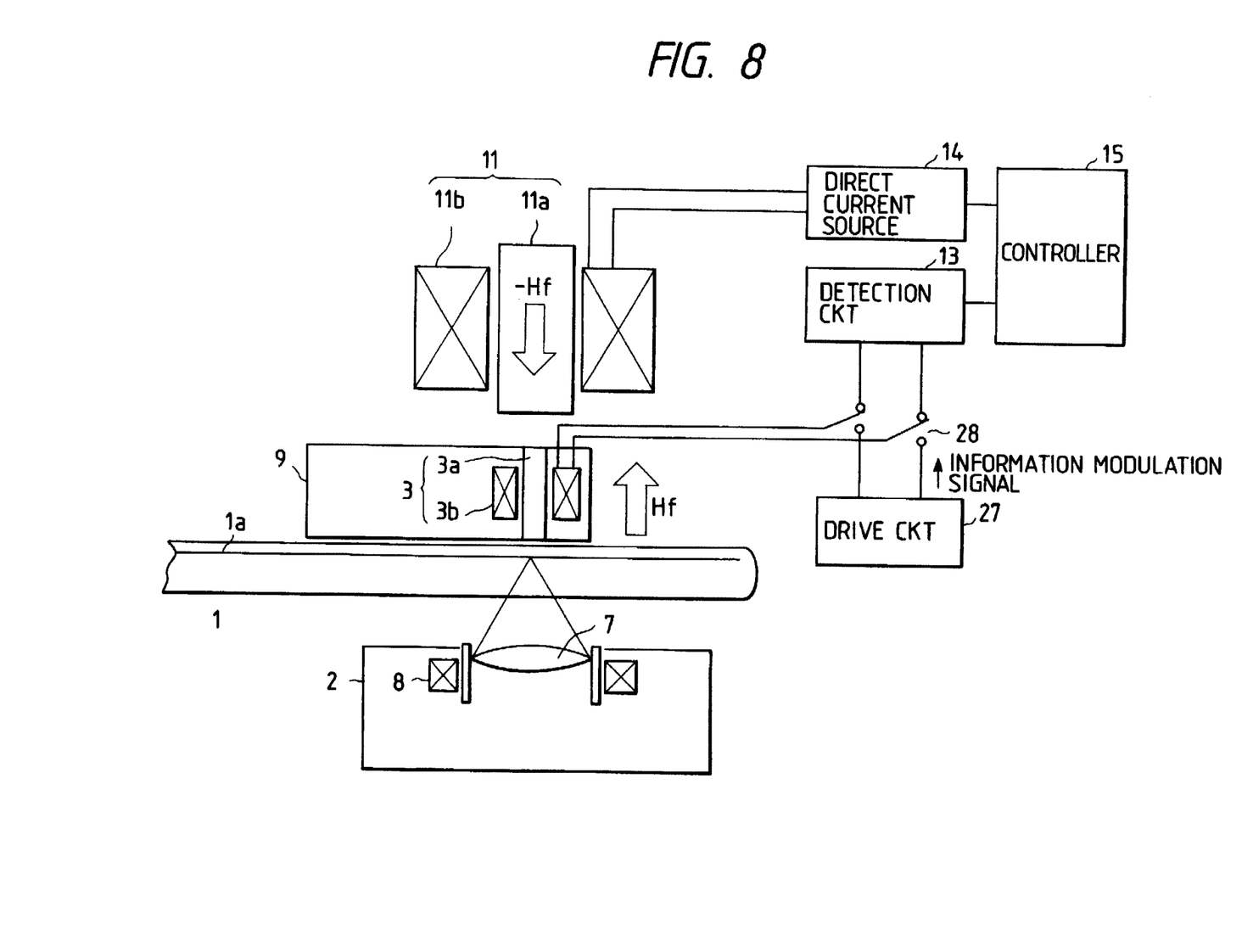
FIG. 8 is a schematic view showing an arrangement of a magnetooptical recording apparatus according to the second embodiment of the present invention.

In the above-mentioned embodiment, a special-purpose detector for detecting an external stray magnetic field is used. The inventors of the present invention experimentally confirmed that an external stray magnetic field can be detected by the magnetic head by the same principle as described above. FIG. 8 shows such a magnetooptical recording apparatus according to the second embodiment of the present invention. The same reference numerals in FIG. 8 denote the same parts as in FIG. 3, and a detailed description thereof will be omitted.

In FIG. 8, during an external stray magnetic field detection operation, the coil 3b of the magnetic head 3 is connected to the detection circuit 13 via a switch 28, and detects an external stray magnetic field according to the same principle as that in the above embodiment. At this time, the core 3a and the coil 3b of the magnetic head 3 have the same functions as those of the magnetic member 12a and the coil 12b in the magnetic field detector 12 in the above embodiment.

When signal recording is performed, the canceling magnetic field generator 11 generates a magnetic field $-H_f$ for canceling an external stray magnetic field $H_f$, and applies it to the disk 1, while a recording current modulated according to an information signal by the drive circuit 27 is supplied to the coil 3b of the magnetic head 3 via the switch 28.

Figure 6:
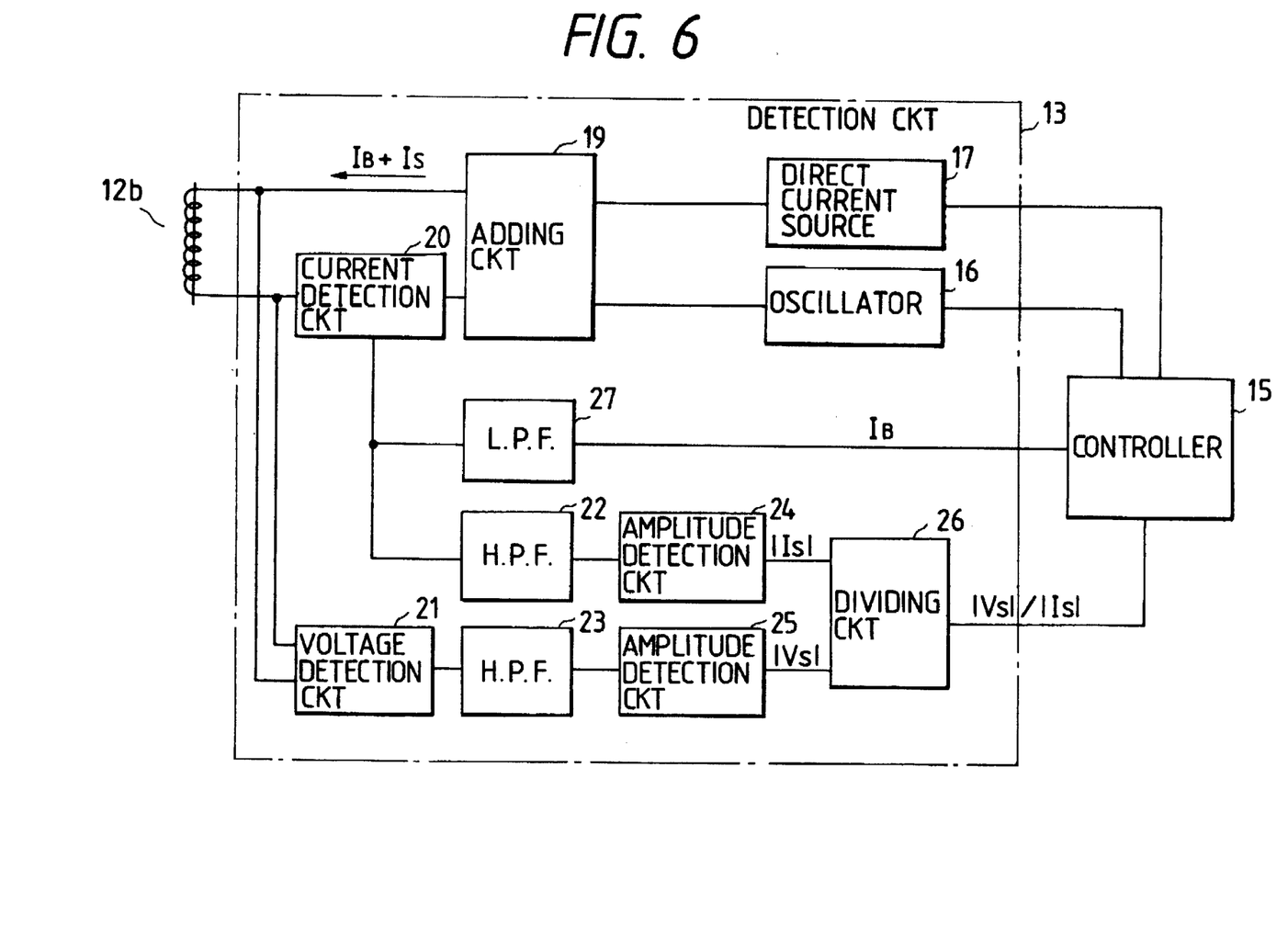
FIG. 6 is a block diagram showing an arrangement of a detection circuit in the apparatus shown in FIG. 3.
Figure 7:
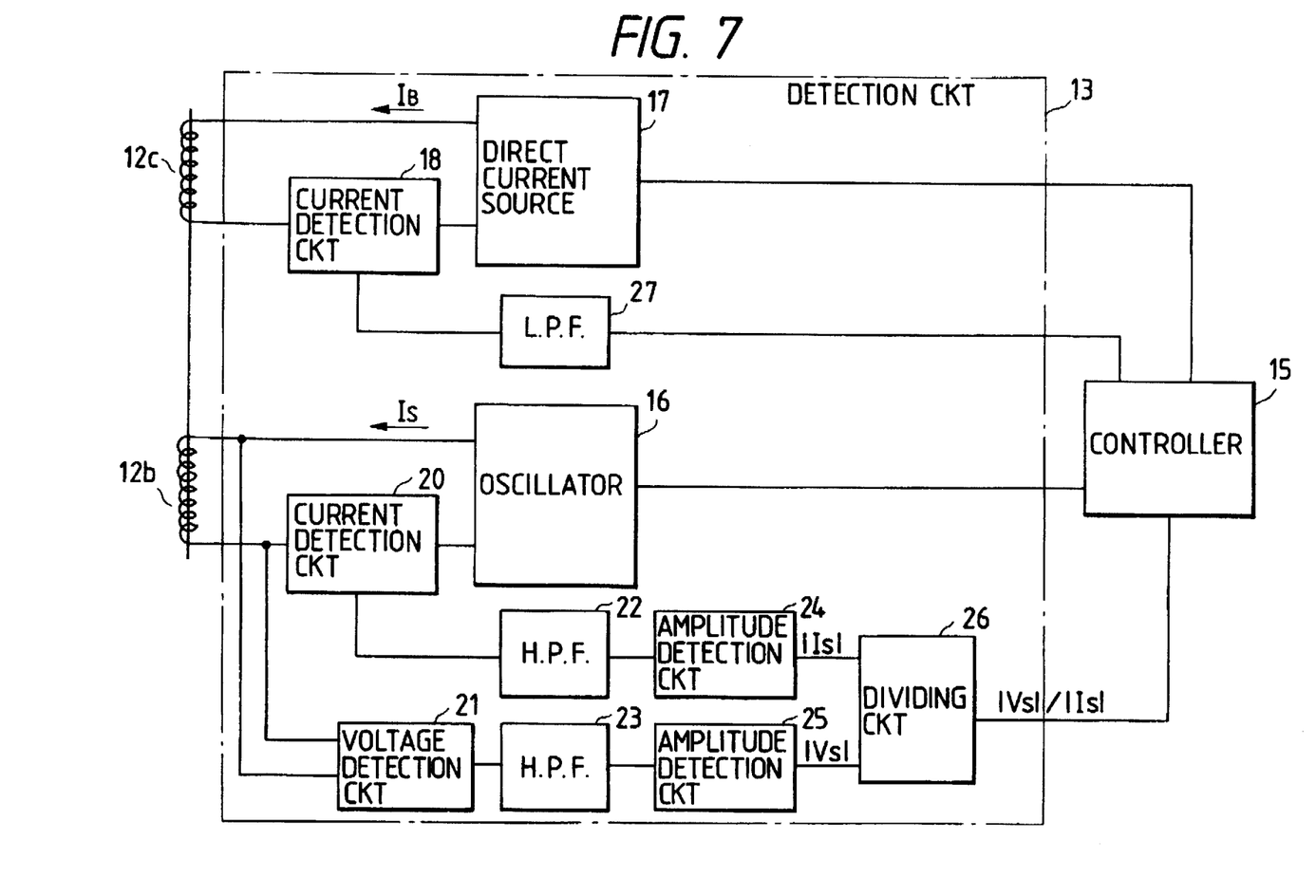
FIG. 7 is a block diagram showing another arrangement of the detection circuit in the apparatus shown in FIG. 3.

In the embodiment shown in FIG. 8, the detection circuit 13 has an arrangement shown in FIG. 6 or 7 as in the first embodiment. An external stray magnetic field is detected by the same method as described in the first embodiment.

Figure 9:
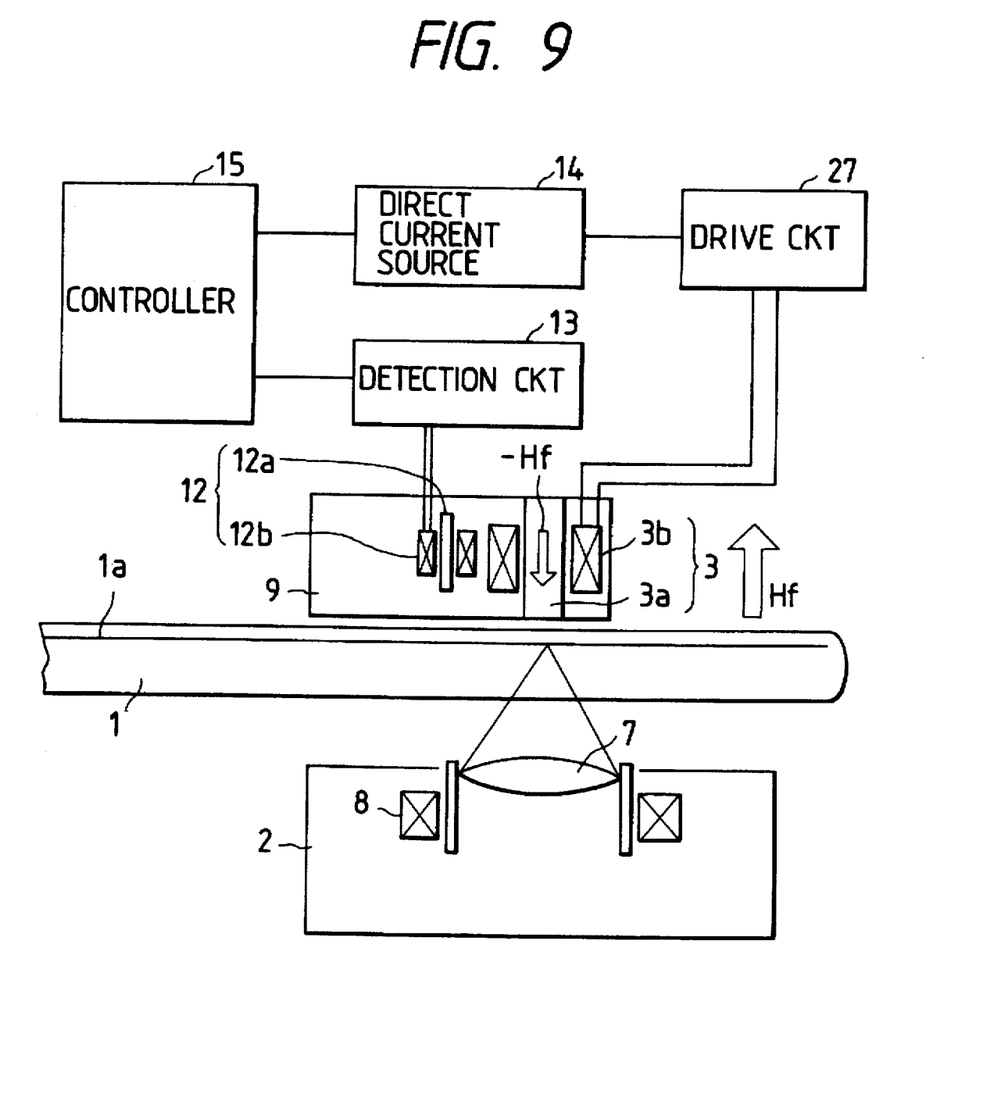
FIG. 9 is a schematic view showing an arrangement of a magnetooptical recording apparatus according to the third embodiment of the present invention.

In each of the above embodiments, a special-purpose canceling magnetic field generator is used for canceling an external stray magnetic field. A canceling magnetic field may be generated using the magnetic field. FIG. 9 shows such a magnetooptical recording apparatus according to the third embodiment of the present invention. The same reference numerals in FIG. 9 denote the same parts as in FIG. 3, and a detailed description thereof will be omitted. Current is supplied from the direct current source 14 to the magnetic head 3 via the drive circuit 27 on the basis of a control signal from the controller 15, and at the same time, a recording current is supplied to the magnetic head 3. The magnetic head 3 generates a modulated magnetic field added with a canceling magnetic field $-H_f$ and applies it to the disk 1. In this case, the drive circuit 27 may add a recording current to current supplied from the direct current source 14, and supply the sum current to the coil 3b of the magnetic head 3, or may separately supply current supplied from the direct current source 14 and a recording current to two different coils provided to the core 3a.

In the embodiment shown in FIG. 9, the detection circuit 13 has an arrangement shown in FIG. 6 or 7 as in the first embodiment. An external stray magnetic field is detected by the same method as described in the first embodiment.

For example, as disclosed in Japanese Laid-Open Patent Application No. 3-216836, in an apparatus, which corresponds to both recording by a magnetic field modulation method and recording by an optical modulation method, and separately comprises a bias magnetic field applying means used in recording by the optical modulation method, the bias magnetic field applying means may be used as a canceling magnetic field generator in recording by the magnetic field modulation method.

The apparatus, which can perform both recording by the magnetic field modulation method and recording by the optical modulation method, as described above, has an arrangement described above with reference to FIG. 3. In this apparatus, when recording is performed by the magnetic field modulation method, the optical head 2 radiates a light beam having a predetermined intensity on the disk 1, and when recording is performed by the optical modulation method, the optical head 2 selectively radiates a light beam, which is intensity-modulated according to information, to the disk 1. When recording is performed by the magnetic field modulation method, i.e., when a light beam having a predetermined intensity is radiated onto the disk 1, the magnetic head 3 applies a magnetic field modulated according to information to the disk 1. At this time, the magnetic field generator 11 applies a magnetic field for canceling an external stray magnetic field detected by the detection circuit 13 to the disk 1.

On the other hand, when recording is performed by the optical modulation method, i.e., when a light beam, which is intensity-modulated according to information, is radiated onto the disk 1, the magnetic head 3 is not driven, and a recording bias magnetic field in a predetermined direction is applied from the magnetic field generator 11 to the disk 1.

In the above-mentioned embodiment, the detection circuit has an arrangement shown in FIG. 6 or 7 as in the first embodiment. An external stray magnetic field is detected by the same method as described in the first embodiment.

The external stray magnetic field canceling operation according to the present invention need not always be executed in a signal recording mode, but may be executed as needed.

Also, the present invention can be applied to an adjustment method wherein upon assembling of an apparatus which comprises at least a canceling magnetic field applying means for applying a magnetic field for canceling an external stray magnetic field, the external stray magnetic field is detected based on the above-mentioned principle, the magnitude of the canceling magnetic field is adjusted and set based on the detected value, and a preset canceling magnetic field is generated in a signal recording mode. In this case, all components of a magnetic field detection means need not be incorporated in the apparatus.

As described above, a magnetooptical recording apparatus according to the present invention comprises an external stray magnetic field detection means and a canceling magnetic field applying means. The apparatus detects an external stray magnetic field based on the shift amount of a B-H curve detected by the magnetic field detector, and cancels the detected external stray magnetic field by a canceling magnetic field, thereby realizing highly reliable signal recording free from the influence of the external stray magnetic field with a simple arrangement.

What is claimed is:

1. A magnetooptical recording apparatus comprising:
   an optical head for irradiating a light beam to a magnetooptical recording medium;
   a magnetic head for applying to the recording medium a magnetic field modulated according to an information signal;
   detection means for detecting an external stray magnetic field applied to the recording medium; and
   magnetic field applying means for applying, to the recording medium, a magnetic field for cancelling the external stray magnetic field in accordance with a detection signal outputted from said detection means,
   wherein said detection means comprises a detector in which at least one coil is wound around a magnetic member, and a detection circuit connected to the coil, and said detection circuit supplies said coil with a variable bias current so as to saturate a magnetic flux generated in said magnetic member in a predetermined direction and detects a current $I_{B1}$ required for saturating the magnetic flux in the predetermined direction and a current $I_{B2}$ required for saturating the magnetic flux in the direction opposite to the predetermined direction to output a signal corresponding to a value of $\frac{1}{2}(I_{B1}+I_{B2})$ as the detection signal.

2. An apparatus according to claim 1, wherein said detection circuit supplies said coil with an AC signal for detecting an impedance of said coil along with supplying said coil with the bias current so as to detect the saturation of the magnetic flux by a drop in the impedance.

3. An apparatus according to claim 2, wherein said detection circuit comprises:
   a current detection circuit for detecting the current supplied to said coil;
   a low-pass filter for extracting a bias current component from an output of said current detection circuit;
   a first high-pass filter for extracting an AC signal component from an output of said current detection circuit;
   a first amplitude detection circuit for extracting a current amplitude from an output of said first high-pass filter;
   a voltage detection circuit for detecting a voltage induced in opposite ends of said coil;
   a second high-pass filter for extracting an AC signal component from an output of said voltage detection circuit;
   a second amplitude detection circuit for detecting a voltage amplitude from an output of said second high-pass filter; and
   a dividing circuit for calculating the impedance of said coil from a ratio of the current amplitude and the voltage amplitude detected by said first and second amplitude detection circuits, respectively.

4. An apparatus according to claim 1, wherein said detector comprises first and second coils wound around said magnetic member, and said detection circuit supplies said first coil with the bias current along with supplying said second coil with an AC signal for detecting an impedance so as to detect the saturation of the magnetic flux by a drop in the impedance.

5. An apparatus according to claim 4, wherein said detection circuit comprises:
   a first current detection circuit for detecting the current supplied to said first coil;
   a low-pass filter for extracting a bias current component from an output of said first current detection circuit;
   a second current detection circuit for detecting the current supplied to said second coil;
   a first high-pass filter for extracting an AC current component from an output of said second current detection circuit;
   a first amplitude detection circuit for detecting a current amplitude from an output of said first high-pass filter;
   a voltage detection circuit for detecting a voltage induced in opposite ends of said second coil;
   a second high-pass filter for extracting an AC signal component from an output of said voltage detection circuit;
   a second amplitude detection circuit for detecting a voltage amplitude from an output of said high-pass filter; and a dividing circuit for calculating the impedance of said coil from a ratio of the current amplitude and the voltage amplitude detected by said first and second amplitude detection circuits, respectively.

6. A method of recording information on a magnetooptical recording medium using a magnetooptical recording apparatus comprising an optical head, a magnetic head and magnetic field generating means, said method comprising the steps of:

detecting an external stray magnetic field applied to the recording medium and outputting a detection signal;

applying, to the recording medium, a magnetic field for cancelling the detected external stray magnetic field by the magnetic field applying means;

irradiating a light beam to the recording medium by the optical head; and applying, to the recording medium, by the magnetic head a magnetic field modulated according to information, wherein said detecting step comprises a step of supplying a coil wound around a magnetic member with a variable bias current so as to saturate a magnetic flux generated in the magnetic member in a predetermined direction and in a direction opposite to the predetermined direction, and detecting a current $I_{B1}$ required for saturating the magnetic flux in the predetermined direction and a current $I_{B2}$ required for saturating the magnetic flux in the direction opposite to the predetermined direction, and outputting a signal corresponding to a value of $\frac{1}{2}(I_{B1}+I_{B2})$ as the detection signal.

7. A magnetooptical recording apparatus comprising:

an optical head for irradiating a light beam to a magnetooptical recording medium;

a magnetic head for applying, to the recording medium, a magnetic field modulated according to an information signal, said magnetic head comprising a core and a coil wound around said core;

detection means for detecting an external stray magnetic field applied to the recording medium;

magnetic field applying means for applying, to the recording medium, a magnetic field for cancelling the external stray magnetic field in accordance with a detection signal outputted from said detection means, wherein said detection means comprises a detection circuit, and said detection circuit supplies said coil with a variable bias current so as to saturate a magnetic flux generated in said core in a predetermined direction and a direction opposite to the predetermined direction, and detects a current $I_{B1}$ required for saturating the magnetic flux in the predetermined direction and a current $I_{B2}$ required for saturating the magnetic flux in the direction opposite to the predetermined direction to output a signal corresponding to a value of $\frac{1}{2}(I_{B1}+I_{B2})$ as the detection signal;

a drive circuit for supplying said magnetic head with a recording current; and switching means for selectively connecting one of said detection circuit and said drive circuit to said magnetic head.

8. An apparatus according to claim 7, wherein said detection circuit supplies said coil with an AC signal for detecting an impedance of said coil along with supplying said coil with the bias current so as to detect the saturation of the magnetic flux by a drop in the impedance.

9. A magnetooptical recording apparatus comprising:

an optical head for irradiating a light beam to a magnetooptical recording medium;

a magnetic head for applying, to the recording medium, a magnetic field modulated according to an information signal;

detection means for detecting an external stray magnetic field applied to the recording medium; and a drive circuit for supplying said magnetic head with current for generating a magnetic field for cancelling said external stray magnetic field in accordance with a detection signal outputted from said detection means and with a recording current modulated according to the information signal, wherein said detection means comprises a detector in which at least one coil is wound around a magnetic member and a detection circuit connected to said coil, and said detection circuit supplies said coil with a variable bias current so as to saturate a magnetic flux generated in said magnetic member in a predetermined direction and in a direction opposite to the predetermined direction and detects a current $I_{B1}$ required for saturating the magnetic flux in the predetermined direction and a current $I_{B2}$ required for saturating the magnetic flux in the direction opposite to the predetermined direction to output a signal corresponding to a value of $\frac{1}{2}(I_{B1}+I_{B2})$ as the detection signal.

10. An apparatus according to claim 9, wherein said detection circuit supplies said coil with an AC signal for detecting an impedance of said coil along with supplying said coil with the bias magnetic current so as to detect the saturation of magnetic flux by a drop in the impedance.

11. An apparatus according to claim 10, wherein said detection circuit comprises:

a current detection circuit for detecting the current supplied to said coil;

a low-pass filter for extracting a bias current component from an output of said current detection circuit;

a first high-pass filter for extracting an AC signal component from an output of said current detection circuit;

a first amplitude detection circuit for detecting a current amplitude from an output of said first high-pass filter;

a voltage detection circuit for detecting a voltage induced in opposite ends of said coil;

a second high-pass filter for extracting an AC signal component from an output of said voltage detection circuit;

a second amplitude detection circuit for detecting a voltage amplitude from an output of said second high-pass filter; and a dividing circuit for calculating an impedance of said coil from a ratio of the current amplitude and the voltage amplitude detected by said first and second amplitude detection circuits, respectively.

12. An apparatus according to claim 9, wherein said detector comprises first and second coils wound around said magnetic member, and said detection circuit supplies said second coil with an AC signal for detecting an impedance along with supplying said first coil with the bias current so as to detect the saturation of the magnetic flux by a drop in the impedance.

13. An apparatus according to claim 12, wherein said detection circuit comprises:

a first current detection circuit for detecting the current supplied to said first coil;

a low-pass filter for extracting a bias current component from an output of said first current detection circuit;

a second current detection circuit for detecting the current supplied to said second coil;

a first high-pass filter for extracting an AC current component from an output of said second current detection circuit;

a first amplitude detection circuit for detecting a current amplitude from an output of said first high-pass filter;

a voltage detection circuit for detecting a voltage induced in opposite ends of said second coil;

a second high-pass filter for extracting an AC signal component from an output of said voltage detection circuit;

a second amplitude detection circuit for detecting a voltage amplitude from an output of said second high-pass filter; and a dividing circuit for calculating an impedance of said coil from a ratio of the current amplitude and the voltage amplitude detected by said first and second amplitude detection circuits, respectively.

14. An apparatus according to claim 9, wherein said magnetic head comprises a core and a coil wound around said core, and said drive circuit supplies said coil with current in which a current for generating a magnetic field for cancelling the external stray magnetic field is added to a recording current modulated according to the information.

15. An apparatus according to claim 9, wherein said magnetic head comprises a core and first and second coils wound around said core, and said drive circuit supplies said first coil with a recording current modulated according to the information signal and also supplies said second coil with current for generating a magnetic field for cancelling the external stray magnetic field.

16. A magnetooptical recording apparatus comprising:

an optical head for selectively irradiating, to a magnetooptical recording medium, one of a light beam having a constant intensity and a light beam intensity-modulated according to an information signal;

a magnetic head for applying, to the recording medium, a magnetic field modulated according to the information signal when the light beam with the constant intensity is irradiated to the recording medium;

detection means for detecting an external stray magnetic field applied to the recording medium; and magnetic field applying means for applying, to the recording medium, a magnetic field for cancelling the external stray magnetic field in accordance with a detection signal outputted from said detection means when the light beam having the constant intensity is irradiated to the recording medium, and for applying, to the recording medium, a recording bias magnetic field in a constant direction when the light beam intensity-modulated according to the information signal is irradiated to the recording medium, wherein said detection means comprises a detector in which at least one coil is wound around a magnetic member and a detection circuit connected to said coil, and said detection circuit supplies said coil with a variable bias current so as to saturate a magnetic flux generated in said magnetic member in a predetermined direction and in a direction opposite to the predetermined direction and detects a current $I_{B1}$ required for saturating the magnetic flux in the predetermined direction and a current $I_{B2}$ required for saturating the magnetic flux in the direction opposite to the predetermined direction to output a signal corresponding to a value of $\frac{1}{2}(I_{B1}+I_{B2})$ as the detection signal.

17. An apparatus according to claim 16, wherein said magnetic field applying means comprises a magnetic member, a coil wound around said magnetic member and a power source for supplying said coil with the current.

18. An apparatus according to claim 16, wherein said detection circuit supplies said coil with an AC signal for detecting an impedance of said coil along with supplying said coil with the bias current so as to detect the saturation of the magnetic flux by a drop in the impedance.

19. An apparatus according to claim 18, wherein said detection circuit comprises:

a current detection circuit for detecting the current supplied to said coil;

a low-pass filter for extracting a bias current component from an output of said current detection circuit;

a first high-pass filter for extracting an AC signal component from an output of said current detection circuit;

a first amplitude detection circuit for detecting a current amplitude from an output of said first high-pass filter;

a voltage detection circuit for detecting a voltage induced in opposite ends of said coil;

a second high-pass filter for extracting an AC signal component from an output of said voltage detection circuit;

a second amplitude detection circuit for detecting a voltage amplitude from an output of said second high-pass filter; and a dividing circuit for calculating the impedance of said coil from a ratio of the current amplitude and the voltage amplitude detected by said first and second amplitude detection circuits, respectively.

20. An apparatus according to claim 16, wherein said detector comprises first and second coils wound around said magnetic member, and said detection circuit supplies said second coil with an AC signal for detecting an impedance along with supplying said first coil with the bias current so as to detect the saturation of the magnetic flux by a drop in the impedance.

21. An apparatus according to claim 20, wherein said detection circuit comprises:

a first current detection circuit for detecting the current supplied to said first coil;

a low-pass filter for extracting a bias current component from an output of said first current detection circuit;

a second current detection circuit for detecting the current supplied to said second coil;

a first high-pass filter for extracting an AC current component from an output of said second current detection circuit;

a first amplitude detection circuit for detecting a current amplitude from an output of said first high-pass filter;

a voltage detection circuit for detecting a voltage induced in opposite ends of said second coil;

a second high-pass filter for extracting an AC signal component from an output of said voltage detection circuit;

a second amplitude detection circuit for detecting a voltage amplitude from an output of said second high-pass filter; and a dividing circuit for calculating an impedance of said coil from a ratio of the current amplitude and the voltage amplitude detected by said first and second amplitude detection circuits, respectively.

22. A magnetooptical recording apparatus comprising:

an optical head for irradiating a magnetooptical recording medium with a light beam;

a magnetic head for applying, to the recording medium, a magnetic field modulated according to an information signal;

detection means for detecting an external stray magnetic field applied to the recording medium;

magnetic field applying means for applying, to the recording medium, a magnetic field for cancelling the external stray magnetic field in accordance with a detection signal output from said detection means, wherein said detection means comprises a detector in which a coil is wound around a magnetic member, and a detection circuit connected to the coil, wherein said detection circuit comprises (i) a current detection circuit for detecting current supplied to said coil; (ii) a low-pass filter for extracting a bias current component from an output of said current detection circuit; (iii) a first high-pass filter for extracting an AC signal component from the output of said current detection circuit; (iv) a first amplitude detection circuit for detecting a current amplitude from an output of said first high-pass filter; (v) a voltage detection circuit for detecting a voltage induced in opposite ends of said coil; (vi) a second high-pass filter for extracting an AC signal component from an output of said voltage detection circuit; (vii) a second amplitude detection circuit for detecting a voltage amplitude from an output of said second high-pass filter; and (viii) a dividing circuit for calculating the impedance of said coil from a ratio of the current amplitude and the voltage amplitude detected by said first and second amplitude detection circuits, respectively, and said detection circuit detects the external stray magnetic field from a relation between a magnetic flux generated inside the magnetic member and a magnetic field extending through the magnetic member, caused by supplying the coil with current;

a current source for supplying said coil with a variable bias current; and an oscillator for supplying said coil with an AC signal having a constant frequency, and wherein said detection circuit detects the external stray magnetic field from a variation in an impedance of said coil with respect to a variation in the bias current.

23. A magnetooptical recording apparatus comprising:

an optical head for irradiating a magnetooptical recording medium with a light beam;

a magnetic head for applying, to the recording medium, a magnetic field modulated according to an information signal, said magnetic head comprising a core and a coil wound around the core;

a drive circuit for supplying said magnetic head with a recording current;

detection means for detecting an external stray magnetic field applied to the recording medium;

magnetic field applying means for applying, to the recording medium, a magnetic field for cancelling the external stray magnetic field in accordance with a detection signal output from said detection means, wherein said detection means comprises a detection circuit, and said detection circuit detects the external stray magnetic field from a relation between a magnetic flux generated inside the core and a magnetic field extending through the core, caused by supplying the coil with current; and switching means for selectively connecting one of said detection circuit and said drive circuit to said magnetic head.

24. An apparatus according to claim 23, further comprising a current source for supplying said coil with a variable bias current and an oscillator for supplying said coil with an AC signal having a constant frequency, and wherein said detection circuit detects the external stray magnetic field from a variation in the impedance of said coil with respect to a variation in the bias current.

25. A magnetooptical recording apparatus comprising:

an optical head for irradiating a magnetooptical recording medium with a light beam;

a magnetic head for applying, to the recording medium, a magnetic field modulated according to an information signal;

detection means for detecting an external stray magnetic field applied to the recording medium;

a drive circuit for supplying said magnetic head with current for generating a magnetic field for cancelling the external stray magnetic field in accordance with a detection signal output from said detection means and a recording current modulated according to the information signal, wherein said detection means comprises a detector in which a coil is wound around a magnetic member and a detection circuit connected to said coil, wherein said detection circuit comprises (i) a current detection circuit for detecting current supplied to said coil; (ii) a low-pass filter for extracting a bias current component from an output of said current detection circuit; (iii) a first high-pass filter for extracting an AC signal component from the output of said current detection circuit; (iv) a first amplitude detection circuit for detecting a current amplitude from an output of said first high-pass filter; (v) a voltage detection circuit for detecting a voltage induced in opposite ends of said coil; (vi) a second high-pass filter for extracting an AC signal component from an output of said voltage detection circuit; (vii) a second amplitude detection circuit for detecting a voltage amplitude from an output of said second high-pass filter; and (viii) a dividing circuit for calculating the impedance of said coil from a ratio of the current amplitude and the voltage amplitude detected by said first and second amplitude detection circuits, respectively, and said detection circuit detects the external stray magnetic field from a relation between a magnetic flux generated inside the magnetic member and a magnetic field extending through the magnetic member, caused by supplying said coil with current;

a current source for supplying said coil with a variable current; and an oscillator for supplying said coil with an AC signal having a constant frequency, and wherein said detection circuit detects the external stray magnetic field from a variation in an impedance of said coil with respect to a variation in the bias current.

26. A magnetooptical recording apparatus comprising:

an optical head for selectively irradiating a magnetooptical recording medium with one of a light beam having a constant intensity and a light beam intensity-modulated according to an information signal;

a magnetic head for applying, to the recording medium, a magnetic field modulated according to an information signal when the recording medium is irradiated with the light beam having the constant intensity;

detection means for detecting an external stray magnetic field applied to the recording medium;

magnetic field applying means for applying, to the recording medium, a magnetic field for cancelling the external stray magnetic field in accordance with a detection signal output from said detection means when the recording medium is irradiated with the light beam having the constant intensity, and for applying, to the recording medium, a recording bias magnetic field with a predetermined direction when the recording medium is irradiated with the light beam intensity-modulated according to the information signal, wherein said detection means comprises a detector in which a coil is wound around a magnetic member, and a detection circuit connected to the coil, wherein said detection circuit comprises (i) a current detection circuit for detecting current supplied to said coil; (ii) a low-pass filter for extracting a bias current component from an output of said current detection circuit; (iii) a first high-pass filter for extracting an AC signal component from the output of said current detection circuit; (iv) a first amplitude detection circuit for detecting a current amplitude from an output of said first high-pass filter; (v) a voltage detection circuit for detecting a voltage induced in opposite ends of said coil; (vi) a second high-pass filter for extracting an AC signal component from an output of said voltage detection circuit; (vii) a second amplitude detection circuit for detecting a voltage amplitude from an output of said second high-pass filter; and (viii) a dividing circuit for calculating the impedance of said coil from a ratio of the current amplitude and the voltage amplitude detected by said first and second amplitude detection circuits, respectively, and said detection circuit detects the external stray magnetic field from a relation between a magnetic flux generated inside the magnetic member and a magnetic field extending through the magnetic member, caused by supplying the coil with current;

a current source for supplying said coil with a variable current; and an oscillator for supplying said coil with an AC signal having a constant frequency, and wherein said detection circuit detects the external stray magnetic field from a variation in the impedance of said coil with respect to a variation in the bias current.

27. A magnetooptical recording apparatus comprising:

an optical head for irradiating a magnetooptical recording medium with a light beam;

a magnetic head for applying, to the recording medium, a magnetic field modulated according to an information signal;

detection means for detecting an external stray magnetic field applied to the recording medium;

magnetic field applying means for applying, to the recording medium, a magnetic field for cancelling the external stray magnetic field in accordance with a detection signal output from said detection means, wherein said detection means comprises a detector in which first and second coils are wound around a magnetic member, and a detection circuit connected to said coils, and wherein said detection circuit supplies said first coil with the bias current along with supplying said second coil with an AC signal for detecting an impedance so as to detect the external stray magnetic field from a variation in the impedance, said detection circuit comprises (i) a first current detection circuit for detecting current supplied to said first coil; (ii) a low-pass filter for extracting a bias current component from an output of said first current detection circuit; (iii) a second current detection circuit for detecting current supplied to said second coil; (iv) a first high-pass filter for extracting an AC current component from an output of said second current detection circuit; (v) a first amplitude detection circuit for detecting a current amplitude from an output of said first high-pass filter; (vi) a voltage detection circuit for detecting a voltage induced in opposite ends of said second coil; (vii) a second high pass filter for extracting an AC current signal component from an output of said voltage detection circuit; (viii) a second amplitude detection circuit for detecting a voltage amplitude from an output of said second high-pass filter; and (ix) a dividing circuit for calculating the impedance of said coil from a ratio of the current amplitude and the voltage amplitude detected by said first and second amplitude detection circuits, respectively, and said detection circuit detects the external stray magnetic field from a relation between a magnetic flux generated inside the magnetic member and a magnetic field extending through the magnetic member, caused by supplying the coil with current.

* * * * *

UNITED STATES PATENT AND TRADEMARK OFFICE
CERTIFICATE OF CORRECTION

PATENT NO. : 5,687,141
DATED : November 11, 1997
INVENTOR(S) : KAZUYOSHI ISHII

It is certified that error appears in the above-identified patent and that said Letters Patent is hereby corrected as shown below:

ON THE COVER PAGE:

Item [56] "References Cited"

Under "FOREIGN PATENT DOCUMENTS", "03134803  6/1991  Japan" should read --3-134803  6/1991  Japan-- and "03216836  9/1991  Japan" should read --3-216836  9/1991  Japan--.

IN THE DISCLOSURE:

COLUMN 11:

Line 5, "from-an" should read --from an--.

COLUMN 16:

Line 5, "medium;" should read --medium; and--.

Signed and Sealed this

Nineteenth Day of May, 1998

Attest:

BRUCE LEHMAN

*Attesting Officer*     *Commissioner of Patents and Trademarks*